(12) United States Patent
Rodin (10) Patent No.: US 8,738,518 B2
(45) Date of Patent: *May 27, 2014

(54) METHODS AND SYSTEMS FOR EXECUTING A PLURALITY OF MONEY TRANSFERS HAVING A FLUCTUATING PARAMETER

(75) Inventor: Michael F. Rodin, Ambler, PA (US)

(73) Assignee: The Western Union Company, Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 12/638,888

(22) Filed: Dec. 15, 2009

(65) Prior Publication Data

US 2011/0066548 A1 Mar. 17, 2011

Related U.S. Application Data

(63) Continuation-in-part of application No. 11/846,453, filed on Aug. 28, 2007, now Pat. No. 7,640,212.

(51) Int. Cl.
*G06Q 40/00* (2012.01)

(52) U.S. Cl.
USPC .................................................. 705/39

(58) Field of Classification Search
USPC .................................................. 705/40
See application file for complete search history.

(56) References Cited

U.S. PATENT DOCUMENTS

| | | | |
|---|---|---|---|
| 4,766,293 A | 8/1988 | Boston | |
| 5,326,960 A | 7/1994 | Tennenbaum | |
| 6,128,598 A * | 10/2000 | Walker et al. | 705/4 |
| 6,205,433 B1 | 3/2001 | Boesch et al. | |
| 7,249,098 B2 * | 7/2007 | Milberger et al. | 705/40 |
| 2002/0111908 A1 | 8/2002 | Milberger et al. | |
| 2002/0161692 A1 | 10/2002 | Loh et al. | |
| 2004/0148255 A1 | 7/2004 | Beck et al. | |
| 2005/0283435 A1 * | 12/2005 | Mobed et al. | 705/39 |
| 2006/0253321 A1 * | 11/2006 | Heywood | 705/14 |
| 2006/0294004 A1 | 12/2006 | Burge | |

OTHER PUBLICATIONS

A process-based view for customer satisfaction Muffatto, Moreno; Panizzolo, Roberto. The International Journal of Quality & Reliability Management 12.9 (1995): 154.*
The frequent-flier dilemma: Should the employer or employee be the beneficiary of these programs? Lansing, Paul; Goldman, Neal P. Journal of Business Ethics 15.6 (Jun. 1996): 661.*
Loyalty trends for the twenty-first century Capizzi, Michael T; Ferguson, Rick. The Journal of Consumer Marketing 22.2/3 (2005): 72-80.*

* cited by examiner

*Primary Examiner* — Hani M Kazimi
*Assistant Examiner* — Hatem M Ali
(74) *Attorney, Agent, or Firm* — Kilpatrick Townsend & Stockton LLP (57) ABSTRACT

Systems and methods are provided for executing a plurality of money transfers, at least one term of which is dependent on the value of a fluctuating parameter, for example a currency exchange rate or the amount of a transaction service fee. The customer may stage a first money transfer at a money-transfer system and a first value of the fluctuating parameter may be determined by a host processor. The first money transfer may then be executed by the money-transfer system using the first value of the fluctuating parameter and a unique lock-in value identifier may be stored in the host processor's memory that associates the first value of the fluctuating parameter with the customer.

17 Claims, 7 Drawing Sheets

METHODS AND SYSTEMS FOR EXECUTING A PLURALITY OF MONEY TRANSFERS HAVING A FLUCTUATING PARAMETER

CROSS-REFERENCES TO RELATED APPLICATIONS

This application is a continuation-in-part of, and claims the benefit of, co-pending, commonly assigned U.S. patent application Ser. No. 11/846,453, filed Aug. 28, 2007, entitled "METHODS AND SYSTEMS FOR EXECUTING A PLURALITY OF MONEY TRANSFERS HAVING FLUCTUATING PARAMETER," the entire disclosure of which is herein incorporated by reference for all purposes.

BRIEF SUMMARY OF THE INVENTION

The present invention relates generally to money transfers and other value transfer transactions. More specifically, the present invention is directed to methods and systems for executing a plurality of money transfers at least one of the terms of which involves one or more parameters that fluctuate over time.

The process of transferring money is well-known. Briefly, a sender presents himself at a location of a financial transaction service provider and provides value, usually cash, to be transferred by the service provider to a recipient for a transfer fee paid to the service provider. Transaction information is entered into a record that is received by a money transfer system. The record includes information that identifies the sender, the recipient, and the amount of money being transferred, among other things. The recipient presents himself to a receive site of the service provider or representative to obtain the transferred money or other value. An attendant at the receive site usually verifies and records the identity of the receiver and gives the receiver the value.

The cost of each money transfer to the customer may be dependent on the value of at least one parameter that fluctuates over time. As one example, money transfers involving different currencies, e.g. cross-border transfers wherein the country in which funds are supplied by the customer is different than the country in which the funds are received by the recipient usually involve the conversion of the funds from one currency to another. The exchange rate (also known as the foreign-exchange rate, forex rate or FX rate) between the two currencies specifies how much one currency is worth in terms of the other. For example an exchange rate of 120 Japanese yen (JPY, ¥) to the United States Dollar (USD, $) means that JPY120 is worth the same as USD 1. A market-based exchange rate will fluctuate over time and changes whenever the values of either of the two component currencies change. Frequently in a cross-border transfer, the sender's funds are converted to the recipient's funds using the exchange rate in effect at the time of the transfer. Up-to-date exchange rates are readily available at any point in time, for example, through various financial institutions, publications, on-line services, etc. As another example, the service provider may charge the customer a transfer fee that fluctuates from time to time based on provider costs, market conditions, competitive factors, etc. As a further example, the service provider (or another foreign exchange provider) may make a foreign currency available to the customer at a retail price different than the wholesale price that the service provider can purchase the foreign currency (herein "currency spread"), and the amount of the currency spread may fluctuate from time to time.

For some businesses, the most effective way to manage the risk associated with fluctuating cost parameters, such as exchange rates in money transfers, is to implement a derivative contract such as a futures contract or an option contract that enables the business to lock into a specific value for the parameter. However, the derivatives market has developed a great deal of complexity, and relatively few individual consumers and small businesses can make practical use of the underlying derivatives as a mechanism for managing costs in a predictable way. Similarly, high-volume customers may also take advantage of contracts with a service provider that fix transaction costs, e.g. money transfer fees, for a particular period of time or for a specified number of transactions. However, an individual consumer or small business may not be involved in the large number of transactions that typically are required to negotiate such contracts. On the other hand, a service provider may want to provide an incentive for smaller customers to use the service provider for repeat transactions by fixing the costs for those transactions, but the service provider is unwilling or unable to negotiate separate contracts with each individual customer.

Accordingly, there is a general need for a convenient means for locking-in one or more of the fluctuating parameters that may be associated with many money transfers, for example money transfers involving different currencies.

BACKGROUND OF THE INVENTION

Embodiments of the present invention provide methods and systems for executing a plurality of money transfers wherein at least one term of the money transfers is dependent on the value of a parameter that fluctuates from time to time, such as a currency exchange rate or a transaction service fee. A money-transfer system may be provided to execute the money transfers. The system may comprise one or more terminal devices adapted to input money transfer information from a customer and/or receive the transferred funds at a receiving destination, a host processor with associated memory adapted to process the money transfer and money transfer information, and a money-transfer network adapted to provide a communications interface between the terminal devices and the host processor. The host processor may be configured to perform steps comprising the method of the present invention.

In one embodiment of the invention, a method for executing a plurality of money transfers comprises receiving information from a customer at the money-transfer system to stage a first money transfer at least one term of which is dependent on the value of a fluctuating parameter, determining a first value for the fluctuating parameter at a first point in time, and executing a first money transfer using the first value of the parameter. A unique identifier that associates the first value of the fluctuating parameter with the customer ("lock-in value identifier") may be stored in the host processor memory for future retrieval by the host processor. Subsequent to the first money transfer, a second money transfer may be staged by or on behalf of the same customer ("the same customer"), wherein the terms of the second money transfer are also dependent on the same fluctuating parameter. A second value of the fluctuating parameter may be determined at a second point in time, and the first value of the fluctuating parameter may be retrieved from the host processor memory using the lock-in value identifier.

In one embodiment, using the host processor, a determination may be made as to whether the first value or the second value of the fluctuating parameter is more favorable to the customer for executing the second money transfer. The second money transfer is then executed through the money transfer system using the more favorable value of the fluctuating parameter. The customer may make any number of subsequent money transfers using the process of the invention and be assured that the value of the fluctuating parameter used to execute each subsequent money transfer will be no less favorable than the value of the parameter used in the first money transfer. In some embodiments, the customer is notified of the amount of benefit realized by using the more favorable value of the fluctuating parameter to execute the second money transfer. Notification can occur at the time the money transfer is sent or at some later point in time (e.g., after the money has been received).

In another embodiment, information related to a money transfer may be received from a customer at the money system, wherein at least one of the terms of the money transfer is dependent on the value of a fluctuating parameter. A current value may be determined for the fluctuating parameter and a determination may be made as to whether or not the money transfer is a repeat transaction for the customer. If the money transfer is not a repeat transaction, a lock-in value identifier may be stored in the host processor's memory that designates the current value of the fluctuating parameter as the lock-in value of the fluctuating parameter for repeat transactions of the customer. If the money transfer is a repeat transaction of the customer, the lock-in value identifier is retrieved from the host processor's memory and a determination is made whether the lock-in value is more favorable than the current value. If the lock-in value is more favorable, the money transfer is executed using the lock-in value, whereas if the lock-in value is not more favorable, the current value is used. In some embodiments, the customer may be given the option of using the lock-in value of the fluctuating parameter for repeat transactions, without determining whether the lock-in value is more favorable than the current value.

In some embodiments, a unique "repeat customer identifier", e.g. a customer's loyalty program identification number, may be used to identify a repeat or otherwise preferred returning customer. The information related to the money transfer provided by the customer may be searched for the repeat customer identifier to determine whether the money transfer is a repeat transaction of the customer. If the repeat customer identifier is not found, i.e. if the money transfer is not a repeat transaction, a repeat customer identifier may be stored in the host processor's memory in association with the lock-in value identifier to be used in subsequent money transfers. If the repeat customer identifier is found, i.e. the money transfer is a repeat transaction, the repeat customer identifier may be used to retrieve the lock-in value identifier from the host processor's memory.

In another embodiment, the information received from the customer in connection with the first money transfer may include the specification of an amount of money to be transferred, a first currency in which the funds are to be provided by the customer and a second currency in which the funds are to be received at the receiving destination. A first currency exchange rate between the first and second currency may be determined, the appropriate amount of funds may be collected from the customer in the first currency and the funds may be converted to the second currency based on the first exchange rate. In addition, a repeat customer identifier that identifies the customer as a repeat customer, and a lock-in exchange rate identifier that associates the first exchange rate with the repeat customer identifier may be stored in the host processor's memory. The converted funds may then be transferred to the receiving destination using the money transfer system.

Information related to a second money transfer, including the repeat customer identifier, may be received at the money transfer system from the customer for a second money transfer involving the first and second currencies, and a second currency exchange rate ("current exchange rate") may be determined. The repeat customer identifier may be used to retrieve the associated lock-in exchange rate identifier from the host processor. The host processor may determine whether the first exchange rate represented by the lock-in exchange rate identifier or the current exchange rate is more favorable to the customer for executing the second money transfer, the appropriate amount of funds may be collected from the customer in the first currency and the funds may be converted to the second currency using the more favorable exchange rate. The converted funds may then be transferred to the receiving destination using the money transfer system. In one embodiment, the foreign exchange risk associated with the lock-in exchange rate may be hedged by the money-transfer service provider.

In another embodiment, a first amount of a service fee may be determined for executing a first money transaction having certain terms. A unique identifier may be stored in the host processor's memory that associates the first amount of service fee with the customer ("service fee lock-in value identifier"), as well as other terms of the first money transfer, if desired. The first service fee amount may be collected from the customer for executing the money transfer using the money transfer system. In subsequent money transfers having substantially the same terms, a second amount of service fee charged for the subsequent money transfer may be determined. The first amount charged for the service fee may be retrieved from the host processor's memory using the service fee lock-in value identifier. The host processor may then determine whether the first service fee amount or the second service fee amount is more favorable for the subsequent money transfer, and the more favorable service fee may be collected from the customer for executing the second money transfer. In other embodiments, a similar method may be used to provide a repeat customer with the more favorable currency spread for the subsequent money transfer, or a discount may be provided to a repeat customer based at least in part on the difference between a first currency spread associated with first money transfer and a second currency spread associated with the second money transfer.

DETAILED DESCRIPTION OF THE INVENTION

Although the present invention will now be described in detail primarily in the context of money transfers, other types of financial transactions may also benefit from the teachings herein. Thus, it is contemplated that transactions to which the present invention applies may include money order purchases and/or redemptions, traveler's check purchases and/or redemptions, money wiring transactions, loans, investment accounts, deposit accounts, and the like.

Figure 1:
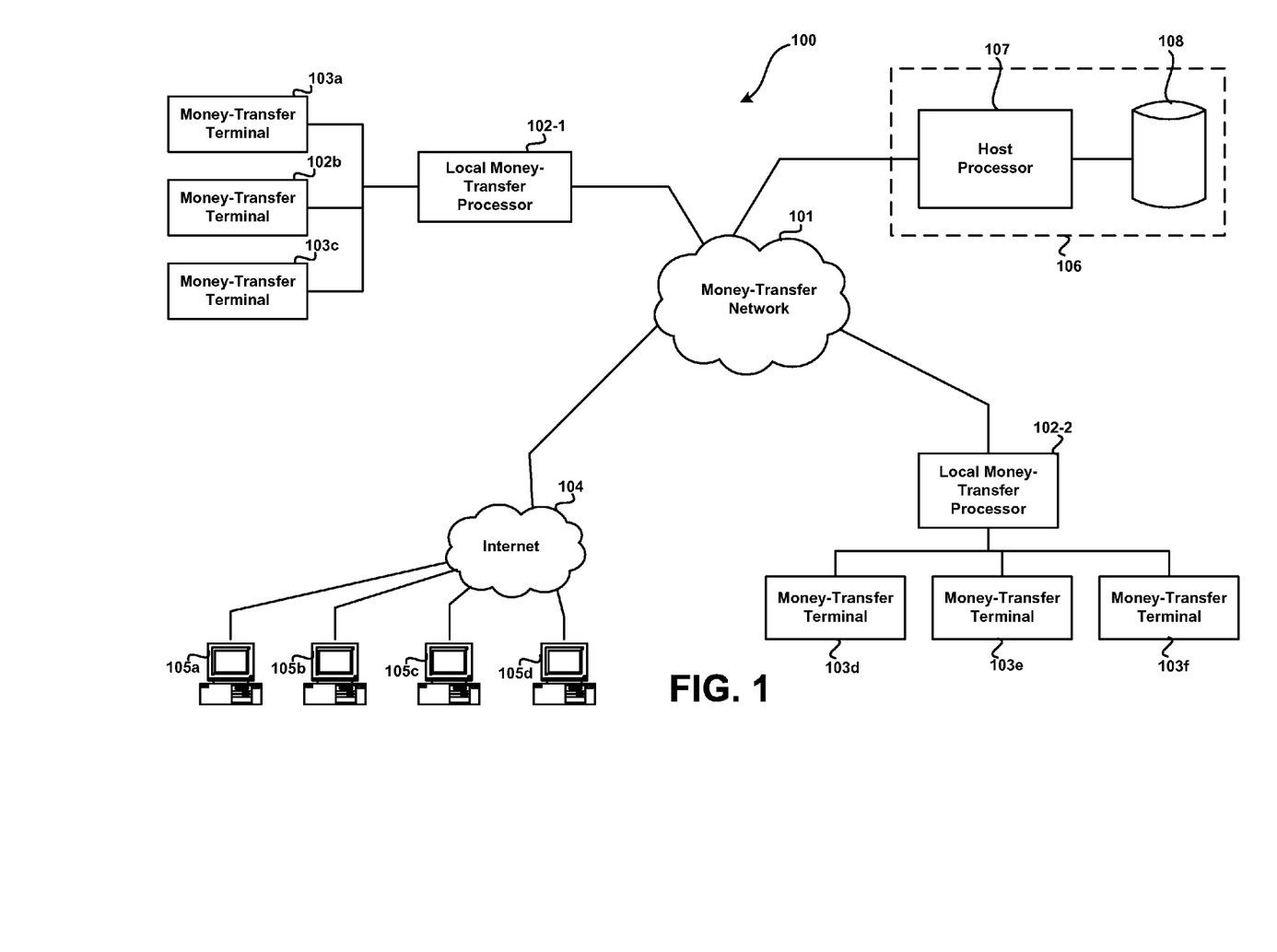
FIG. 1 is a schematic illustration of a money transfer system suitable for implementing the method of the present invention.

A money-transfer system 100 that may be used to effect money transfers in accordance with the invention is illustrated by the block diagram of FIG. 1. The money transfers may be effected through a money-transfer network 101 that provides a communications interface between various terminal devices that may be used to initiate money transfers and to receive funds transferred in this manner. For example, local money-transfer processors 102-1 and 102-2 may be provided at various geographical locations and used to operate money-transfer terminal devices 103a-d and 103 d-f respectively, with each of the money-transfer processors 102 being interfaced with the money-transfer network 101. In such instances, the processors 102 and terminal devices 103 are generally disposed at a physical location that operates as a money-transfer office, which a customer may visit physically to arrange for funds to be transferred.

A customer may arrange for funds to be transferred and pay any fees charged by the service provider, using any suitable means of transferring value that currently exists, or is hereafter created For example, the customer may provide funds in cash or by check, or use a credit card or account, a debit card or account, an automated clearing house, a stored-value card, and the like.

When a customer physically visits a money-transfer office, a clerk may operate one of the terminal devices 103 to provide information used in effecting the money transfer. Alternatively, the terminal devices 103 may comprise a self-service terminal operated by the customer herself in staging the money transfer. Similarly, such a physical location may be used by the recipient to receive the transferred funds with clerk-operated or with self-operated terminal devices 103 to receive the funds. In embodiments where the money transfer involves the exchange of different currencies, the physical locations of the initiating and receiving processor 102/terminal device 103 may typically be in different countries.

Money transfers may alternatively be staged using other types of interfaces with the money-transfer network 101. As shown in FIG. 1, money-transfer network 101 may be interfaced with the Internet 104, which may in turn be interfaced with various computational terminal devices 105. This arrangement permits a customer to access money-transfer functionality by connecting his computational terminal device 105 to the Internet 104 to access a web page where such functionality is implemented. With such an interface, the customer will usually provide funds for transfer by using a credit card or account, debit card or account, an automated clearing house, stored-value card or account, or similar mechanism that may be implemented electronically, instead of by providing cash. Other types of terminal devices may be provided with the money-transfer network 101 in various alternative embodiments, including terminal devices with telephone interfaces (including IVR/VRU and those that respond to DTMF tones), cable interfaces, wireless interfaces, ATM's and the like. For example, one or more of terminal devices 103 or 105 may provide mobile access to money transfer system 100. For example, terminal device 103 or 105 may be a cell phone, laptop computer, personal digital assistant, or similar mobile device using mobile telecommunication, voice and/or data.

A host processing system 106 comprising host processor 107 and associated memory 108 may process the money transfer and money transfer information, as well as maintain records related to money transfer system 100. Host processing system 106 may also comprise other hardware elements, for example, input devices, output devices, storage media, storage media readers, special purpose processors, communication devices, etc. Host processing system 106 may be provided in communication with a number of other elements of money transfer system 100. For example, money transfer processors 102 and the Internet 104 may be linked with processor 107 through communications links in money transfer network 101. The communications links may be electrical, optical, wireless, or any other type of communications link known to those of skill in the art. Host processor 107 may comprise software elements configured to implement methods of the present invention and memory 108 may include any suitable data storage media, e.g. remote, local, fixed and/or removable storage devices plus storage media for temporarily and/or more permanently containing computer-readable information. It will be apparent to those skilled in the art that other substantial variations may be made in money transfer system 100 in accordance with the specific requirements.

Figure 2:
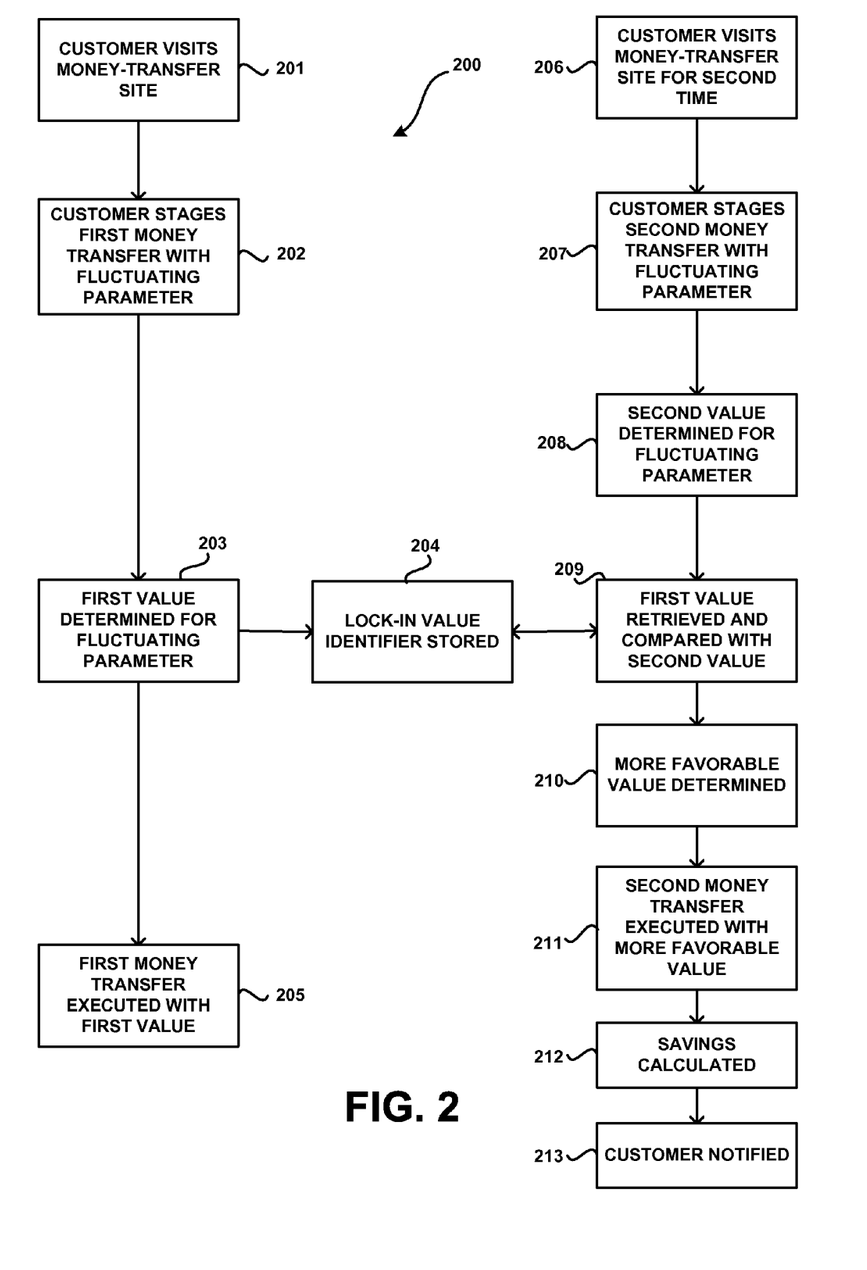
FIG. 2 is a block-diagram representation of one embodiment of method for executing a plurality of money transfers by the same customer in accordance with the invention, each money transfer having the same fluctuating parameter.

The flow diagram of FIG. 2 provides a general overview of a process 200 that may be used for executing a plurality of money transfers using money transfer system 100 in accordance with the invention. A first money transfer may be initiated at block 201 with the customer visiting a money-transfer site of money transfer system 100, either by visiting a physical site where there is access to a money-transfer terminal device 103 or by visiting a virtual site such as where the money transfer is initiated from a web site over the Internet 104. At block 202, information may be received from the customer at money-transfer system 100 to stage the first money transfer. The information may include the specification of the usual terms of a money transfer, e.g. the amount of money to be transferred, the identity of the customer, the identity of the recipient of the money transfer, the location to which the money is to be transferred, etc., and at least one term that is dependent on the value of a parameter that fluctuates from time to time ("fluctuating parameter"). As will be described in connection with other embodiments hereinafter, examples of a fluctuating parameter may include a currency exchange rate, a service fee, an interest rate, currency spread, etc.

At block 203, a first value of the fluctuating parameter may be determined at a first point in time, e.g. at the time the first money transfer is staged at block 202, at the time the funds to be transferred in the first money transfer are collected from the customer, at the time the funds are transferred in the first money transfer, at the time the funds are picked up by the recipient, or at any other time related to the first money transfer, e.g. a time that is mutually agreed upon by the customer and the money-transfer service provider, or a time that is set internally by the money-transfer service provider. The first value of the fluctuating parameter may be input into money-transfer system 100 manually at the money-transfer site, e.g. using money-transfer terminal device 103, or may be acquired by money-transfer system 100, e.g. through access by host processor 107 to a database stored in memory 108 or available on-line, from a service that monitors the fluctuating parameter and provides periodic values to the money-transfer service provider, or from the Internet 104 or other source that monitors the value of the fluctuating parameter.

At block 204, host processor 107 may be programmed to store a unique lock-in value identifier in host processor memory 108 that associates the first value of the fluctuating parameter with the customer, i.e. locks in the first value of the fluctuating parameter for consideration in subsequent money transfers of the customer. In some embodiments, a unique identifier that identifies the customer as a repeat or returning customer ("repeat customer identifier") may be associated with the lock-in value identifier when the lock-in value identifier is stored in the host processor's memory. The lock-in value identifier may comprise computer-readable code that can be used by host processor 107 to retrieve the first value of the fluctuating parameter from memory 108 when the customer stages a subsequent money transfer at money-transfer system 100. The repeat customer identifier may also be computer-readable code that can be used by host processor 107 to retrieve from memory 108 the lock-in value identifier that is associated with a particular repeat customer. The identifiers may be manually entered into memory 108, may be read from a card (e.g., magnetic stripe), may be read by or from a wireless device (e.g., by RFID) or may be automatically stored in memory 108 by host processor 107. At block 205, the terms of the money transfer staged at block 202, including the first value of the fluctuating parameter determined at block 203, may then be used to execute the first money transfer using money transfer system 100.

At some time subsequent to the first money transfer executed at block 205, the same customer may visit a money-transfer site at block 206. In some embodiments, the repeat customer identifier may be used to determine that the customer who stages the second money transfer at block 207 is the same customer that staged the first money transfer at block 202. The money-transfer site may be the same or different than the money-transfer site that the customer visited at block 201, but the site is a part of or in communication with money transfer system 100. At block 207, information may be received from the customer at money-transfer system 100 to stage a second money transfer, the terms of which may include the same fluctuating parameter as in the first money transfer. At block 208, a second value of the fluctuating parameter may be determined at a second point in time, e.g. at the time the second money transfer is staged at block 207. At block 209, the first value of the fluctuating parameter stored in memory 108 at block 204 may be retrieved by processor 107 using the lock-in value identifier. In some embodiments, the repeat customer identifier may be used to retrieve the lock-in value identifier at block 209 if the repeat customer identifier was stored in association with the lock-in value identifier at block 204.

The fluctuating parameter may be locked-in by a customer for a specified period of time, a specific number of transfers, or both (e.g., the next three transfers before a specific date) and can relate to future transactions involving exchange of the same currencies (e.g., same send-receive corridor) or can relate to the exchange of different currencies, either within a particular receive region of the world or to any country in the world.

In one embodiment, host processor 107 may compare the retrieved first value with the second value of the fluctuating parameter determined at block 208. A determination may be made by host processor 107 at block 210 as to whether the first value of the fluctuating parameter is more favorable for the customer to use for the execution of the second money transfer than the second value. The terms of the money transfer staged at block 207, including the more favorable value of the fluctuating parameter determined at block 210, may then be used to execute the second money transfer at block 211 using money transfer system 100. The customer may make any number or a specified number of subsequent money transfers using the process represented by blocks 206-211 and be assured that the value of the fluctuating parameter used to execute the subsequent money transfers will be no less favorable than the value used for the first money transfer. In some embodiments, the customer may be required to pay an additional lock-in fee or fees for this assurance.

At block 212, processor 107 may be configured to calculate the amount of savings, the more favorable amount of funds to be received at a receiving destination, or a combination of both ("amount of benefit") realized as the result of using the more favorable value of the fluctuating parameter to execute the money transfer at block 211. The customer may then be notified of the amount of benefit at block 213 by any suitable means incorporated into money-transfer system 100. For example, the customer may be notified of the amount of benefit by a clerk as the result of information displayed on a money-transfer terminal 103, the amount of benefit may be printed on the customer's receipt evidencing the money transfer, the amount of benefit may be displayed on the screen of computational device 105, the amount of benefit could be communicated to the customer by email or other electronic means (including via RFID to a mobile device).

Figure 3:
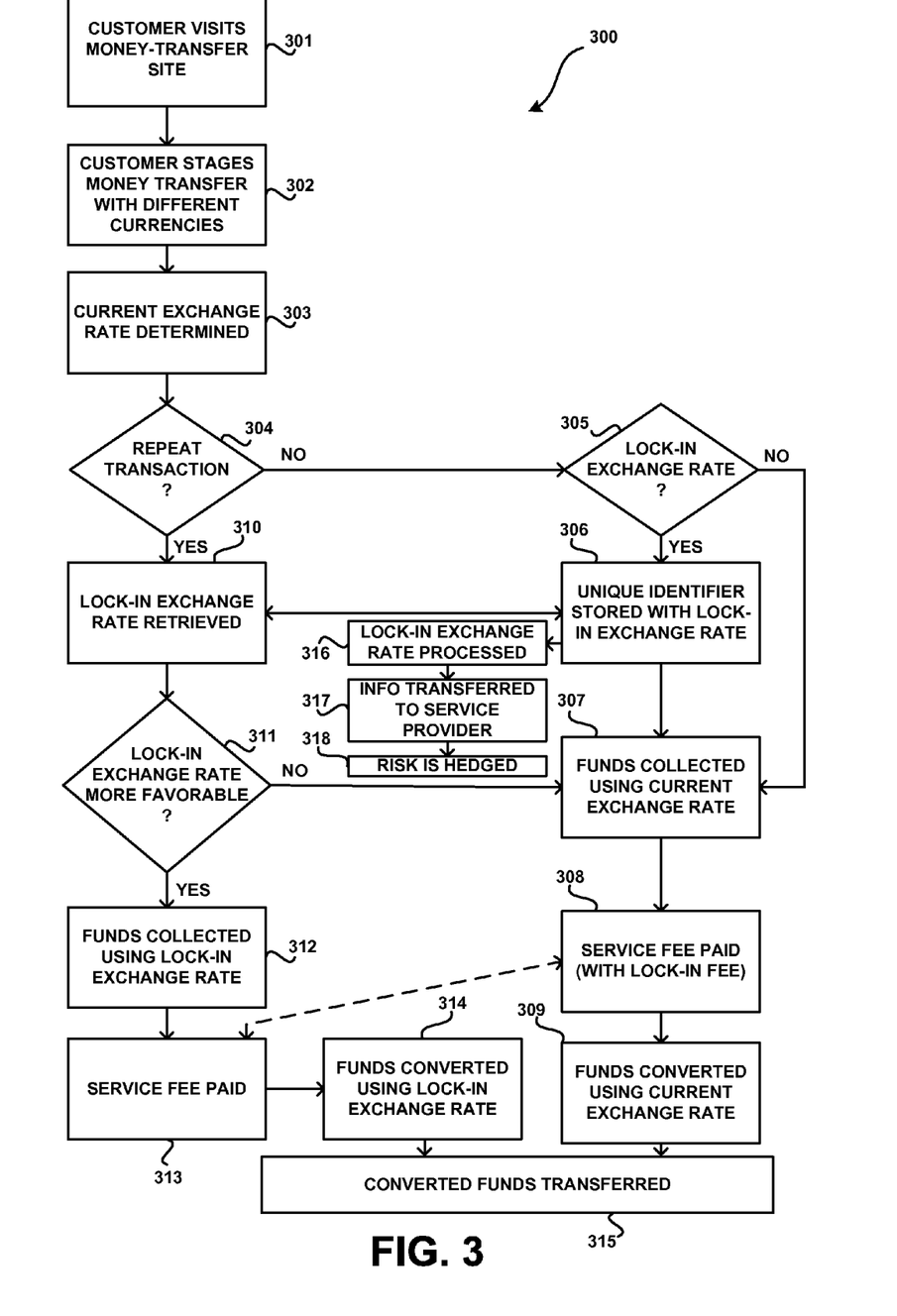
FIG. 3 is a block-diagram representation of another embodiment of a method for executing a money transfer involving different currencies in accordance with the invention.

FIG. 3 illustrates a process 300 that may be used in accordance with the invention for a plurality of money transfers involving two currencies that have a fluctuating exchange rate. At block 301, a customer may visit a money-transfer site of money transfer system 100 and information may be received from the customer at money-transfer system 100 to stage a money transfer at block 302. In staging the money transfer, the customer may provide a number of specifications, including the amount of money to be transferred, the identity of the customer (which may be accomplished using a repeat customer identifier), the identity of the recipient of the money transfer, and the location to which the money is to be transferred, which may or may not be in another country. The customer may also specify the currency in which the money to be transferred is supplied ("first currency"), and the currency in which the money transferred is to be received ("second currency"). In one embodiment, the customer may also specify the manner in which the first currency is to be converted into the second currency. For example, if the customer wishes to transfer 100 U.S. Dollars to a recipient in Mexico, and to have the Mexican recipient receive the transferred money in Mexican pesos, the recipient will receive 1000 Mexican Pesos if the exchange rate that applies to the transfer is 10 pesos/US$. Alternatively, the recipient would receive 900 Mexican Pesos if the applicable exchange rate is 9 pesos/US$. In another embodiment, customer may stage the money transfer in terms of the amount to be received by the recipient in the second currency, such as by specifying that 1000 Mexican Pesos are to be transferred. An amount in U.S. Dollars that is equivalent to 1000 Mexican pesos using the applicable exchange rate may then be collected from the customer for the money transfer.

The applicable exchange rate for the money transfer staged at block 303 may be identified as the "current exchange rate", which in one embodiment may be the exchange rate in effect at the time the money transfer is staged at block 302. In other embodiments, the current exchange rate may be the exchange rate in effect at the time the funds to be transferred are collected from the customer. In still other embodiments, the current exchange rate may be the exchange rate in effect at the time the funds are transferred or picked up by the recipient, or may be a specific exchange rate agreed upon between the customer and the money-transfer service provider, or derived internally by the money-transfer service provider. For example, the current exchange rate may be different than the wholesale exchange rate paid by the service provider to purchase the currency. In any event, host processor 107 may be configured to determine at block 303 the current exchange rate that is to be used to convert the first to the second currencies in connection with the money transfer staged at block 302. As one example, host processor may determine the current exchange rate at the time the money transfer is staged, e.g. through access to an on-line monitoring service or a subscription database.

At block 304, a determination may be made as to whether the money transfer staged at block 302 is a "repeat transaction" by the customer. For example, the customer or the service provider may designate the money transfer as a repeat transaction and enter this designation into money transfer system 100 during the staging process at block 302, e.g. using a money transfer terminal device 103 or through a computational terminal device 105. As previously mentioned, in some embodiments the customer may be identified by a "repeat customer identifier", which is used by processor 107 to identify that the money transfer being staged at block 302 is a repeat transaction. This determination may be made by host processor 107 by searching the customer's staging information for the presence of the repeat customer identifier. The repeat customer identifier may be an identification number assigned by the service provider to preferred or returning customers, e.g. those that participate in the service provider's loyalty program or have executed or are expected to execute multiple money transfers. Alternatively, processor 107 may automatically create and store the repeat customer identifier in association with the lock-in exchange rate identifier at block 306 in memory 108, as discussed below.

A "repeat transaction" may be defined for the purposes of this description as any money transfer by the same customer within a specified period of time, e.g. as specified by the money transfer service provider, wherein the customer's subsequent money transfer involves the same fluctuating parameter as the first money transfer, e.g. the exchange rate between a first currency and second currency. A repeat transaction may involve the same or different amounts of money, the same or different recipients, and/or the same or different destination locations as the first money transfer.

If the determination at block 304 is that the staged money transfer is not a repeat transaction, host processor 107 may be configured to query the customer at block 305, e.g. using money transfer terminal device 103, if the customer wants to fix or "lock-in" the current exchange rate determined at block 303 so that it will apply to repeat transactions. If the customer chooses to lock-in the current exchange rate at block 305, host processor 107 may be configured to store a unique identifier in memory 108 at block 306 that associates the current exchange rate determined at block 303 with the customer ("lock-in exchange rate identifier") and sets that current exchange rate as the lock-in exchange rate for repeat transactions of the customer. Processor 107 may also store a repeat customer identifier in memory 108 as a means of retrieving the lock-in exchange rate identifier during a repeat transaction. At block 307, the appropriate amount of funds may then be collected from the customer based on the current exchange rate determined at block 303. At block 308, the customer may pay an appropriate service fee for the money transfer staged at block 302, which may include an additional amount for the lock-in privilege ("lock-in fee"). In some cases, there may be no lock-in fee. For example, a service provider may choose not to charge a lock-in fee to loyalty program members, to customers who send a certain principal amount and/or pay fees above a certain threshold; or to customers who send from select locations or geographic areas, who send to certain expected payout locations, or whose transactions relate to certain send-receive corridors. At block 309, the funds may be converted from the first currency to the second currency using the current exchange rate.

If the determination at block 304 is that the money transfer staged at block 302 is a repeat transaction, e.g. by detecting the repeat customer identifier, host processor 107 may be configured to retrieve the lock-in exchange rate at block 310, e.g. by using the repeat customer identifier to retrieve the lock-in exchange rate identifier stored in memory 108 at block 306 in connection with a previous money transfer. In a preferred embodiment, processor 107 may then determine at block 311 whether the lock-in exchange rate is more or less favorable for the customer in the money transfer staged at block 302 than the current exchange rate determined at block 303. In another embodiment, a comparison with the current exchange rate may not made at block 311. If the lock-in exchange rate is determined at block 311 to be more favorable than the current exchange rate determined at block 303 or if a comparison with the current exchange rate is not made at block 311, the appropriate amount of funds may be collected from the customer at block 312 based on the lock-in exchange rate, and the customer may pay the appropriate service fee at block 313 for the money transfer staged at block 302.

Optionally, some or all of the lock-in fee paid at block 308 for the first money transfer by the customer may be applied against the service fee paid at block 313 for a repeat money transfer, as indicated by the dotted line between blocks 308 and 313 and/or may be applied against the currency spread; i.e. the difference between the wholesale exchange rate paid by the service provider and the retail exchange rate the service provider offers to customers. The funds may then be converted from the first currency to the second currency at block 314 using the lock-in exchange rate. The converted funds may then transferred to the recipient at block 315 using money transfer system 100.

If it is determined at block 311 that the lock-in exchange rate is not more favorable than the current exchange rate, i.e. if the current exchange rate is equal to or less than the lock-in exchange rate, or if a lock-in rate is not established at block 305, funds may be collected from the customer based on the current exchange rate, as indicated in block 307, the appropriate service fee for the money transfer may be paid at block 308 (without a lock-in fee), and the funds may be converted at block 309 from the first currency to the second currency using the current exchange rate. Some or all of the lock-in fee paid at block 308 for the first money transfer by the customer may optionally be used to offset service fees paid at block 308 for repeat money transfers, even if funds are converted at block 309 using the current exchange rate. The converted funds may be transferred to the recipient at block 315 using money transfer system 100.

In one embodiment, process 300 may include steps designed to reduce the risk associated with setting the lock-in exchange rate for one or more customer's repeat transactions. For example, at block 316, the lock-in exchange rate stored at block 306 for each repeat customer, or an aggregate and net exchange rate for a plurality of repeat customers, may be processed by processor 107 and periodically stored in memory 108. At block 317, the information processed at block 316 may be transferred to the money-transfer service provider, and at block 318 a person or system at the service provider may hedge the risk created by the lock-in exchange rate(s). As one example, the money transfer service provider may hedge the risk by purchasing a foreign exchange option that gives the service provider the right to use the lock-in exchange rate when it converts funds at block 314 from the first currency to the second currency during repeat transactions. The service provider may or may not exercise the option right depending on the determination made at block 311 as to whether the lock-in exchange rate is more favorable than the current exchange rate. If the lock-in exchange rate is more favorable, the service provider may exercise the right to purchase the required funds in the second currency at the lock-in exchange rate for the conversion at block 314, thereby avoiding the necessity of purchasing the funds at the higher current exchange rate. If the lock-in exchange rate is less favorable, the service provider will not exercise the option and will effect the conversion at block 309 using the current exchange rate. As another example, the service provider may hedge the risk by purchasing an outright forward exchange contract at the lock-in exchange rate if the amount and time period of the conversions from the first currency to the second currency for one or more customer's repeat money transfers is known.

As previously described, the customer usually pays for the staged money transfer by paying a service fee in addition to the amount of money that is to be transferred. Payment may be made in a variety of different ways in different embodiments, including by cash, by credit card or account, by debit card or account, by automated clearing house, by check, by stored-value card or account, or by any other suitable payment mechanism. From time to time, the money transfer service provider may change the service fee and therefore the same service fee may not be charged to the customer for subsequent money transfers with substantially the same terms. The present invention may be used to assure the customer that the service fee charged by the service provider will be no greater for subsequent money transfers than the service fee paid for the first money transfer.

Figure 4:
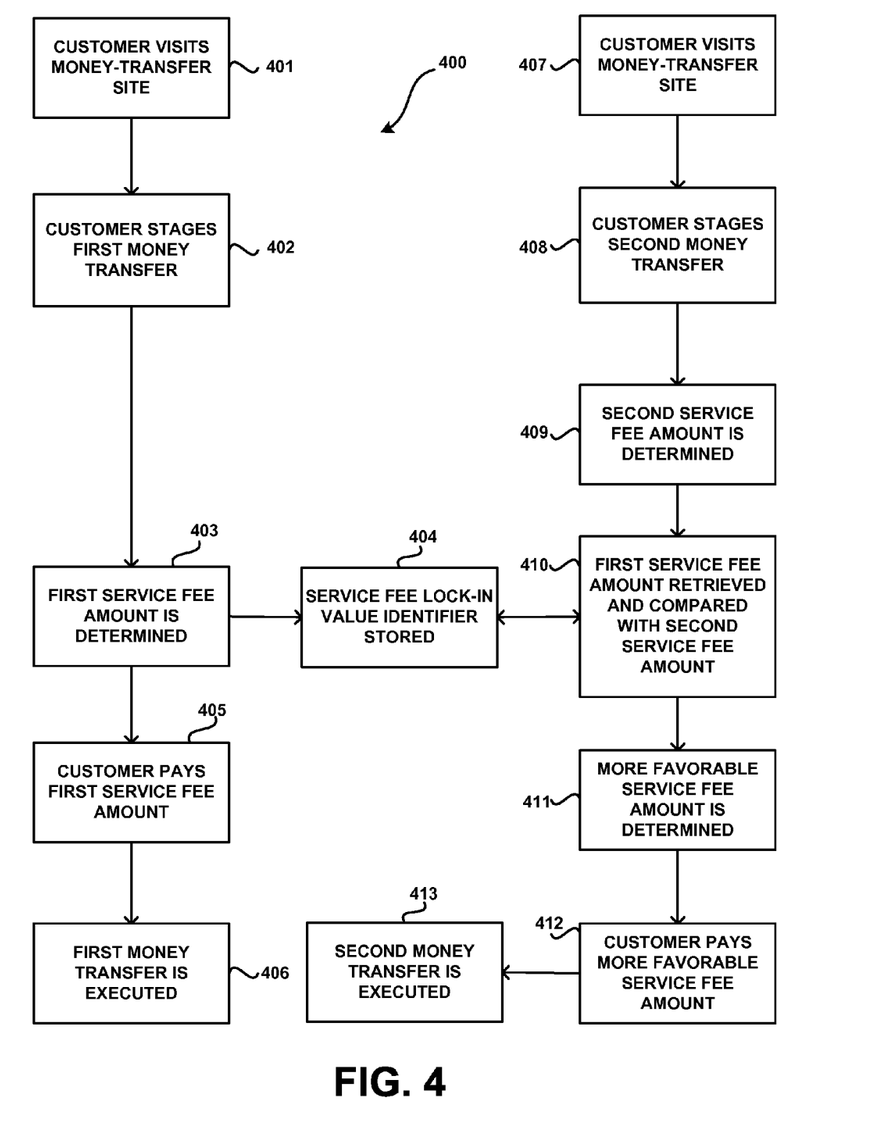
FIG. 4 is a block-diagram representation of still another embodiment of a method for executing a plurality of money transfers in accordance with the invention wherein the customer is charged a service fee.

For example, FIG. 4 illustrates a process 400, similar to process 200 described in FIG. 2, wherein the fluctuating parameter is the service fee paid by the customer for the money transfer staged at block 202. Referring to FIG. 4, the customer may visit a money-transfer site at block 401 and stage a first money transfer at block 402, as previous described in connection with FIG. 2. Processor 107 may determine at block 403 the amount of the current service fee paid for the money transfer staged by the customer at block 402. At block 404, a unique identifier may be stored in memory 108 of processor 107 that associates the customer with the terms of the money transfer staged at block 402 ("service fee lock-in value identifier") and the amount of the current service fee paid in connection therewith ("first service fee amount"). The customer may then be charged the first service fee amount at block 405 and the money transfer staged at block 402 may be executed at block 406 according to its terms.

At some time subsequent to the first money transfer executed at block 406, the same customer may visit a money-transfer site at block 407 and stage a money transfer at block 408 having substantially the same terms as the first money transfer staged at block 402. At block 409, processor 107 may determine the amount of the then current service fee charged for the second money transfer staged at block 408. In one embodiment, processor 107 may designate the then current service fee as the "second service fee amount". Alternatively, processor 107 may be configured to calculate the second service fee amount by subtracting all or any portion of the lock-in fee paid at block 308 (FIG. 3) from the then current service fee charged for the second money transfer staged at block 408.

At block 410, the service fee lock-in value identifier stored at block 404 may be used by processor 107 to retrieve the first service fee amount from memory 108 and compare it with the second service fee amount. Processor 107 may determine the more favorable service fee amount for the customer at block 411 and the customer may be charged the more favorable service fee amount at block 412 for the second money transfer. At block 413, the second money transfer may be executed using money-transfer system 100.

In another embodiment, a process similar to process 200 (FIG. 2) and process 400 (FIG. 4) may be provided wherein the fluctuating parameter is the currency spread used by the service provider to provide funds for the money transfer. For example, processor 107 may be configured to calculate the amount of the currency spread used for the first money transfer. A unique identifier may be stored in memory 108 of processor 107 that associates the customer with the amount of the currency spread used in connection with the first money transfer. Processor 107 may then determine the amount of the currency spread used by the service provider to provide funds for the second money transfer, retrieve the amount of the currency spread used for the first money transfer using the unique identifier, and compare the amounts of the two currency spreads. In one embodiment, processor 107 may determine the more favorable currency spread and use the more favorable currency spread for the second money transfer. Alternatively, all or any portion of the currency spread used for the second money transfer may be applied as a discount against the second service fee amount. The money transfer provider (or another foreign exchange provider) may charge the customer a fee for the ability to take advantage of the more favorable currency spread, or to share in the more favorable currency spread through a discount in the second service fee.

Figure 5:
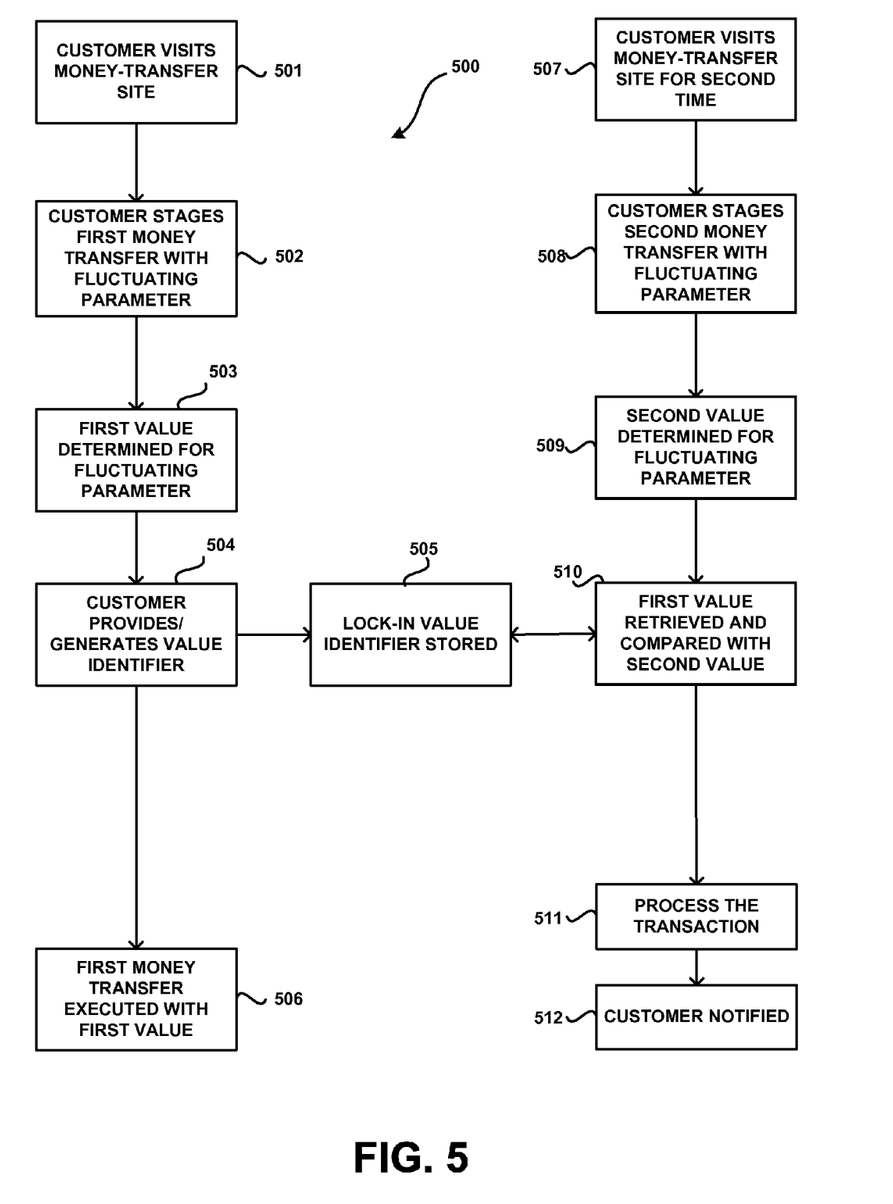
FIG. 5 is a flow-diagram representation of one embodiment of a method for executing a plurality of money transfers in accordance with the invention wherein the customer if providing a repeat customer identifier.

The flow diagram of FIG. 5 provides a process 500 that may be used for executing a plurality of money transfers having a customer provided/generated repeat customer identifier using money transfer system 100 in accordance with the invention. A first money transfer may be initiated at block 501 with the customer visiting a money-transfer site of money transfer system 100, by visiting a physical site where there is access to a money-transfer terminal device 103, by visiting a virtual site such as where the money transfer is initiated from a web site over the Internet 104, or by accessing a money-transfer location via a mobile device. At block 502, information may be received from the customer at money-transfer system 100 to stage the first money transfer. The information may include the specification of the usual terms of a money transfer, e.g. the amount of money to be transferred, the identity of the customer, the identity of the recipient of the money transfer, the location to which the money is to be transferred, etc., and at least one term that is dependent on the value of a parameter that fluctuates from time to time ("fluctuating parameter"). As will be described in connection with other embodiments hereinafter, examples of a fluctuating parameter may include a currency exchange rate, a service fee, an interest rate, currency spread, etc.

At block 503, a first value of the fluctuating parameter may be determined at a first point in time, e.g. at the time the first money transfer is staged at block 502, at the time the funds to be transferred in the first money transfer are collected from the customer, at the time the funds are transferred in the first money transfer, at the time the funds are picked up by the recipient, or at any other time related to the first money transfer, e.g. a time that is mutually agreed upon by the customer and the money-transfer service provider, or a time that is set internally by the money-transfer service provider. The first value of the fluctuating parameter may be input into money-transfer system 100 manually at the money-transfer site, e.g. using money-transfer terminal device 103, or may be acquired by money-transfer system 100, e.g. through access by host processor 107 to a database stored in memory 108 or available on-line, from a service that monitors the fluctuating parameter and provides periodic values to the money-transfer service provider, or from the Internet 104 or other source that monitors the value of the fluctuating parameter.

At block 504, host processor 107 may be programmed to receive a unique lock-in value identifier in host processor memory 108 that associates the first value of the fluctuating parameter with the customer, i.e. locks in the first value of the fluctuating parameter for consideration in subsequent money transfers of the customer. In one embodiment, the unique identifier that identifies the customer as a repeat or returning customer (e.g., "repeat customer identifier") may be associated with the lock-in value identifier when the lock-in value identifier is stored in the host processor's memory. The unique identifier or (repeat customer identifier) may be a constructed from information provided to host processor 107 by the customer. For example, the customer may provide a cellular (or mobile) telephone number, a land-line telephone number, a home (or business) address, an email address, a loyalty program number, a username/password combination, the customer's social security number, the customer's biometric information, the customer's fingerprint, the customer's ID for money transfer system 100, etc. Further, any combination of such personal information supplied by the customer may be used to generate the unique identifier. Accordingly, the unique identifier for the customer may be provided by the customer and used for subsequent transactions to identify the lock-in of the fluctuating value.

Furthermore, the lock-in value identifier may comprise computer-readable code that can be used by host processor 107 to retrieve the first value of the fluctuating parameter from memory 108 when the customer stages a subsequent money transfer at money-transfer system 100. The repeat customer identifier may also be computer-readable code that can be used by host processor 107 to retrieve from memory 108 the lock-in value identifier that is associated with a particular repeat customer. The identifiers may be manually entered into memory 108, may be read from a card (e.g., magnetic stripe), may be read by or from a wireless device (e.g., by RFID) or may be automatically stored in memory 108 by host processor 107.

At block 506, the terms of the money transfer staged at block 502, including the first value of the fluctuating parameter determined at block 503, may then be used to execute the first money transfer using money transfer system 100. At some time subsequent to the first money transfer executed at block 506, the same customer may visit a money-transfer site at block 507. In some embodiments, the repeat customer identifier may be used to determine that the customer who stages the second money transfer at block 508 is the same customer that staged the first money transfer at block 502. The money-transfer site may be the same or different than the money-transfer site that the customer visited at block 501, but the site is a part of or in communication with money transfer system 100. At block 508, information may be received from the customer at money-transfer system 100 to stage a second money transfer, the terms of which may include the same fluctuating parameter as in the first money transfer. At block 509, a second value of the fluctuating parameter may be determined at a second point in time, e.g. at the time the second money transfer is staged at block 508. At block 510, the first value of the fluctuating parameter stored in memory 108 at block 505 may be retrieved by processor 107 using the lock-in value identifier. In some embodiments, the repeat customer identifier may be used to retrieve the lock-in value identifier at block 510 if the repeat customer identifier was stored in association with the lock-in value identifier at block 505.

The fluctuating parameter may be locked-in by a customer for a specified period of time, a specific number of transfers, or both (e.g., the next three transfers before a specific date) and can relate to future transactions involving exchange of the same currencies (e.g., same send-receive corridor) or can relate to the exchange of different currencies, either within a particular receive region of the world or to any country in the world.

In one embodiment, host processor 107 may compare the retrieved first value with the second value of the fluctuating parameter determined at block 509. At block 511, the money transfer may be processed using the amount of the locked-in fluctuating parameter retrieved based on the customer supplied unique identifier. The customer may then be notified of the completion of the money transfer at block 512 by any suitable means incorporated into money-transfer system 100. For example, the customer may be notified of by a clerk as the result of information displayed on a money-transfer terminal 103, by a display on the screen of computational device 105, by email or other electronic means (including via RFID to a mobile device), by a voicemail message, a short message service (SMS) message, a call to the customer's mobile (or cellular) device, etc.

Figure 6:
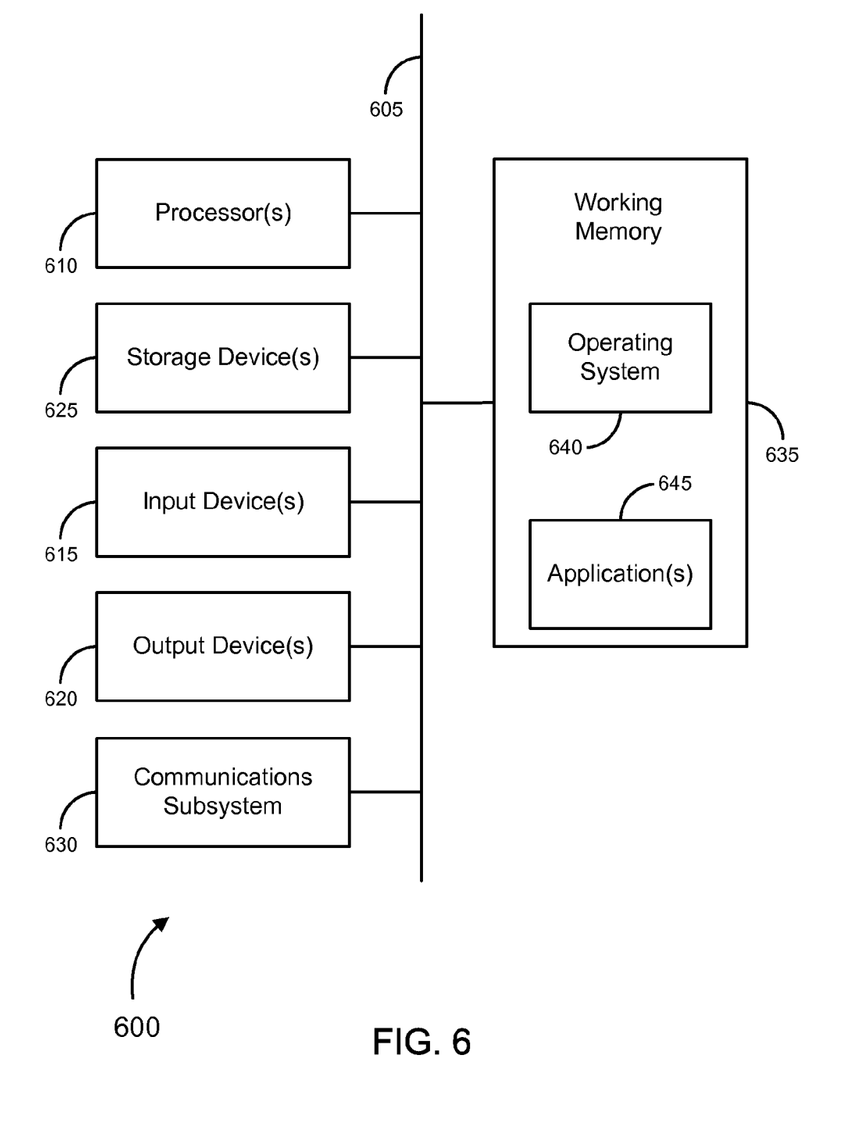
FIG. 6 is a generalized schematic diagram illustrating a computer system, in accordance with various embodiments of the present invention.

FIG. 6 provides a schematic illustration of one embodiment of a computer system 600 that can perform the methods of the invention, as described herein. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements can include one or more processors 610, including without limitation, one or more general purpose processors and/or one or more special purpose processors (such as digital signal processing chips, graphics acceleration chips, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640 and/or other code, such as one or more application programs 645, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 600) to perform methods of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another machine-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 600, various machine-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 625. Volatile media includes, without limitation, dynamic memory, such as the working memory 635. Transmission media includes coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio wave and infrared data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
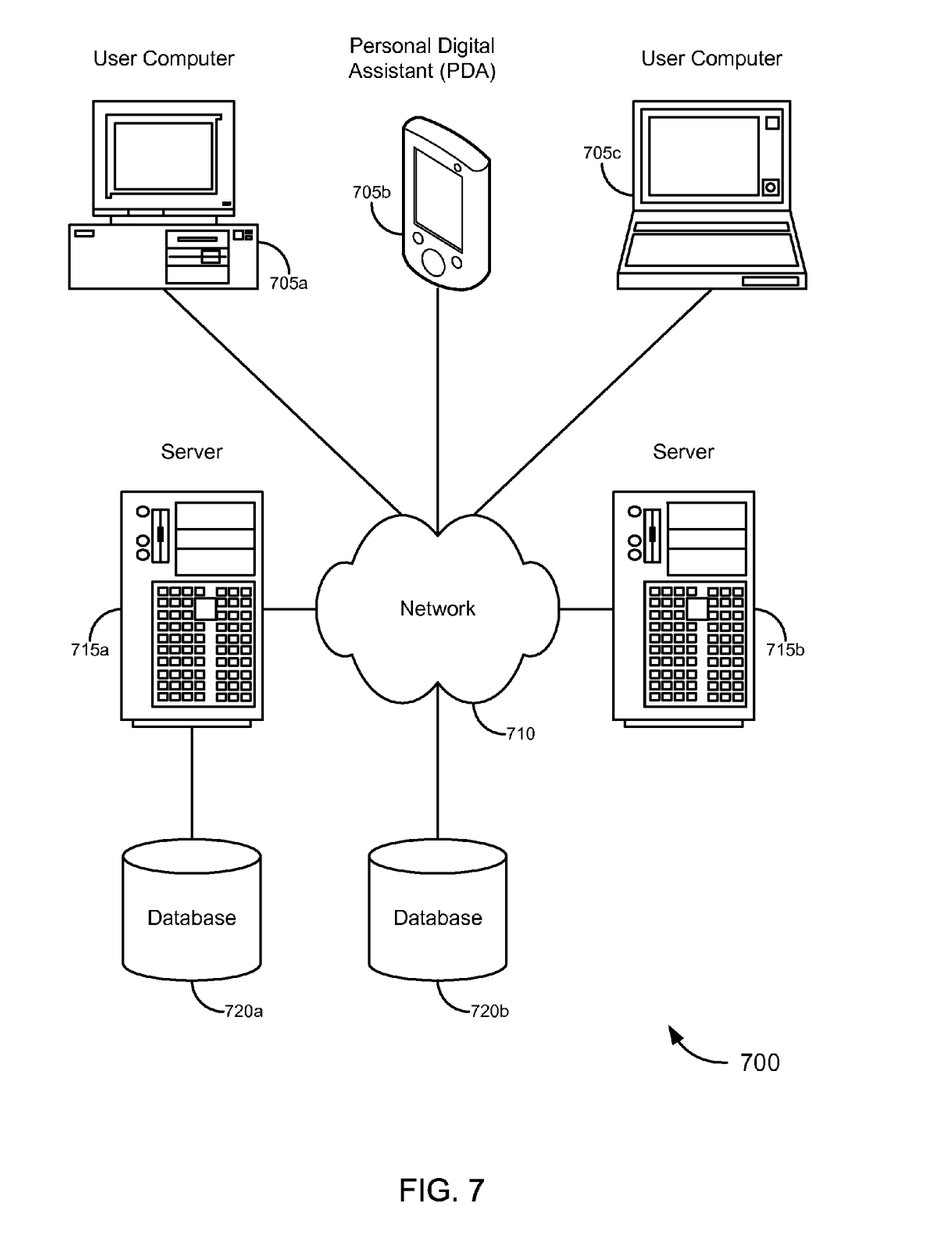
FIG. 7 is a block diagram illustrating a networked system of computers, which can be used in accordance with various embodiments of the present invention.

Merely by way of example, FIG. 7 illustrates a schematic diagram of a system 700 that can be used in accordance with one set of embodiments. The system 700 can include one or more user computers 705. The user computers 705 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 705 can also have any of a variety of applications, including one or more applications configured to perform methods of the invention, as well as one or more office applications, database client and/or server applications, and web browser applications. Alternatively, the user computers 705 can be any other electronic device, such as a thin-client computer, Internet-enabled mobile telephone, and/or personal digital assistant (PDA), capable of communicating via a network (e.g., the network 710 described below) and/or displaying and navigating web pages or other types of electronic documents. Although the exemplary system 700 is shown with three user computers 705, any number of user computers can be supported.

Certain embodiments of the invention operate in a networked environment, which can include a network 710. The network 710 can be any type of network familiar to those skilled in the art that can support data communications using any of a variety of commercially available protocols, including without limitation TCP/IP, SNA, IPX, AppleTalk, and the like. Merely by way of example, the network 710 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 715. Each of the server computers 715 may be configured with an operating system, including without limitation any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 may be a web server, which can be used, merely by way of example, to process requests for web pages or other electronic documents from user computers 705. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 705 to perform methods of the invention.

The server computers 715, in some embodiments, might include one or more application servers, which can include one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 705 and/or another server 715. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 705 via a web server (as described above, for example). Similarly, a web server might receive web page requests and/or input data from a user computer 705 and/or forward the web page requests and/or input data to an application server. In some cases a web server may be integrated with an application server.

In accordance with further embodiments, one or more servers 715 can function as a file server and/or can include one or more of the files (e.g., application code, data files, etc.) necessary to implement methods of the invention incorporated by an application running on a user computer 705 and/or another server 715. Alternatively, as those skilled in the art will appreciate, a file server can include all necessary files, allowing such an application to be invoked remotely by a user computer 705 and/or server 715. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720. The location of the database(s) 720 is discretionary. Merely by way of example, a database 720a might reside on a storage medium local to (and/or resident in) a server 715a (and/or a user computer 705). Alternatively, a database 720b can be remote from any or all of the computers 705, 715, so long as the database can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720 can be a relational database, such as an Oracle™ database, that is adapted to store, update, and retrieve data in response to SQL-formatted commands. The database might be controlled and/or maintained by a database server, as described above, for example.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims:

What is claimed is:

1. A method for executing a plurality of money transfers, the method comprising:
   providing a money-transfer system comprising a host processing system having a host processor with associated memory, wherein the money transfer system is operated by a service provider;
   receiving from a customer at the money-transfer system information related to a first money transfer to be executed by the service provider, wherein at least one term of the money transfer is dependent on the value of a fluctuating parameter;
   including in the fluctuating parameter one or more of an exchange rate between a first currency in which funds are provided by the customer and a second currency in which funds are received at a receiving destination;
   charging a service fee to the customer for executing a money transfer, or a currency spread between a wholesale exchange rate paid by the service provider and a retail exchange rate the service provider offers to customers;
   associating the fluctuating parameter with the customer's loyalty program identification number, wherein the customer's loyalty program identifier is a unique repeat customer identifier, wherein the unique repeat customer identifier does not have associated monetary value;
   using the customer's loyalty program identification number for subsequent transactions which involve the same currencies over the same send-receive corridor for which the fluctuating parameter is configured to be locked in;

determining a first value of the fluctuating parameter at a first point in time;

executing, by the host processing system, the first money transfer using the first value of the fluctuating parameter;

receiving, at the host processing system from the customer, a unique lock-in value identifier to lock-in the fluctuating parameter;

storing, by the host processing system, in the memory of the host processing system the customer provided unique lock-in value identifier that associates the first value of the fluctuating parameter with the customer;

receiving from the same customer at the money-transfer system information related to a second money transfer to be executed by the service provider, wherein at least one of the terms of the second money transfer is dependent on the value of the fluctuating parameter;

determining, by the host processing system, a second value of the fluctuating parameter at a second point in time when making the second money transfer;

retrieving, by the host processing system, the first value of the fluctuating parameter from the host processor's memory using the customer provided lock-in value identifier;

determining that the first value of the fluctuating parameter is more favorable to the customer for executing the second money transfer;

executing, by the host processing system, the second money transfer with the money-transfer system using the first value of the fluctuating parameter, wherein the risk of loss associated with using the more favorable value of the fluctuating parameter is assumed by the service provider; and notifying the customer of the completion of the money transfer by electronic means.

2. The method as recited in claim 1, further comprising configuring the host processing system to associate the unique repeat customer identifier with the customer and to use the unique repeat customer identifier to determine that the second money transfer customer is the same as the first money transfer customer.

3. The method as recited in claim 2, further comprising configuring the host processing system to associate the unique repeat customer identifier with the lock-in value identifier when the lock-in value identifier is stored in the host processor's memory, and to use the unique repeat customer identifier to retrieve the lock-in value identifier.

4. The method as recited in claim 1, further comprising notifying the customer of the amount of benefit realized by using the more favorable value of the fluctuating parameter to execute the second money transfer.

5. The method as recited in claim 1, wherein the receiving from the customer at the money-transfer system the information related to a first money transfer to be executed by the service provider, comprises receiving the information from a mobile device of the customer.

6. The method as recited in claim 5, wherein the mobile device comprises one or more of the following: a cellular device, a personal digital assistant (PDA), a cellular telephone, a mobile telephone, and a portable computer.

7. The method as recited in claim 1, wherein the receiving of the money-transfer system information, comprises receiving the information via one or more of the following: a cellular device, a mobile device, a voice response unit (VRU), an interactive voice response (IVR) system, a telephone, a short message system (SMS) text, and an email.

8. The method as recited in claim 1, wherein the unique lock-in value identifier received from the customer comprises one or more of the following: a cellular telephone number, a mobile telephone number, a land-line telephone number, a street address, an email address, a loyalty program number, a username/password combination, the customer's social security number, the customer's biometric information, the customer's fingerprint, and the customer's ID for the money transfer system.

9. A system for executing a plurality of money transfers through a service provider, the system comprising:

one or more terminal devices configured to input money transfer information regarding a customer and/or to receive the transferred funds at a receiving destination;

a host processor with associated memory configured to process the money transfer and money transfer information; and a money-transfer network configured to provide a communications interface between the terminal devices and the host processor, wherein the host processor is configured to:

receive from a customer at the money-transfer system information related to a first money transfer to be executed by the service provider, wherein at least one term of the money transfer is dependent on the value of a fluctuating parameter;

include in the fluctuating parameter one or more of an exchange rate between a first currency in which funds are provided by the customer and a second currency in which funds are received at a receiving destination;

charge a service fee to the customer for executing a money transfer, or a currency spread between a wholesale exchange rate paid by the service provider and a retail exchange rate the service provider offers to customers;

associate the fluctuating parameter with the customer's loyalty program identification number, wherein the customer's loyalty program identifier is a unique repeat customer identifier, wherein the unique repeat customer identifier does not have associated monetary value;

use the customer's loyalty program identifier for subsequent transactions which involve the same currencies over the same send-receive corridor for which the fluctuating parameter is configured to be locked in;

determine a first value of the fluctuating parameter at a first point in time;

execute the first money transfer using the first value of the fluctuating parameter;

receive, from the customer, a unique lock-in value identifier to lock-in the fluctuating parameter;

store in the memory of the host processing system the customer provided unique lock-in value identifier that associates the first value of the fluctuating parameter with the customer;

receive from the same customer at the money-transfer system information related to a second money transfer to be executed by the service provider, wherein at least one of the terms of the second money transfer is dependent on the value of the fluctuating parameter;

determine a second value of the fluctuating parameter at a second point in time when making the second money transfer;

retrieve the first value of the fluctuating parameter from the host processor's memory using the customer provided lock-in value identifier; determine that the first value of the fluctuating parameter is more favorable to the customer for executing the second money transfer;

execute the second money transfer with the money-transfer system using the value of the first value the fluctuating parameter, wherein the risk of loss associated with using the more favorable value of the fluctuating parameter is assumed by the service provider; and notify the customer of the completion of the money transfer by electronic means.

10. The system as recited in claim 9, wherein the host processor is further configured to:

associate the unique repeat customer identifier with the lock-in value identifier when the lock-in value identifier is stored in the host processor's memory; and search the customer information related to the second money transfer for the unique repeat customer identifier to determine that the second money transfer customer is the same as the first money transfer customer.

11. The system as recited in claim 10, wherein the host processor is further configured to use the unique repeat customer identifier to retrieve the lock-in value identifier.

12. The system as recited in claim 9, wherein the fluctuating parameter is the exchange rate between a first currency in which funds are provided by the customer and a second currency in which funds are received, a service fee charged to the customer for executing the money transfer, or the currency spread between the wholesale exchange rate paid by the service provider and the retail exchange rate the service provider offers to customers.

13. The system as recited in claim 9, wherein the one or more terminal devices comprise a mobile device.

14. The system as recited in claim 13, wherein the mobile device comprises one or more of the following: a cellular device, a personal digital assistant (PDA), a cellular telephone, a mobile telephone, and a portable computer.

15. The system as recited in claim 9, wherein the unique lock-in value identifier received from the customer comprises one or more of the following: a cellular telephone number, a mobile telephone number, a land-line telephone number, a street address, an email address, a loyalty program number, a username/password combination, the customer's social security number, the customer's biometric information, the customer's fingerprint, and the customer's ID for the money transfer system.

16. A non-transitory machine-readable medium having sets of instructions which, when executed by a machine, cause the machine to:

receive from a customer at the money-transfer system information related to a first money transfer to be executed by the service provider, wherein at least one term of the money transfer is dependent on the value of a fluctuating parameter;

include in the fluctuating parameter one or more of an exchange rate between a first currency in which funds are provided by the customer and a second currency in which funds are received at a receiving destination;

charge a service fee to the customer for executing a money transfer, or a currency spread between a wholesale exchange rate paid by the service provider and a retail exchange rate the service provider offers to customers;

associate the fluctuating parameter with the customer's loyalty program identification number, wherein the customer's loyalty program identifier is a unique repeat customer identifier, wherein the unique repeat customer identifier does not have associated monetary value;

use the customer's loyalty program identifier for subsequent transactions which involve the same currencies over the same send-receive corridor for which the fluctuating parameter is configured to be locked in;

determine a first value of the fluctuating parameter at a first point in time;

execute the first money transfer using the first value of the fluctuating parameter;

receive, from the customer, a unique lock-in value identifier to lock-in the fluctuating parameter;

store in the memory of the host processing system the customer provided unique lock-in value identifier that associates the first value of the fluctuating parameter with the customer;

receive from the same customer at the money-transfer system information related to a second money transfer to be executed by the service provider, wherein at least one of the terms of the second money transfer is dependent on the value of the fluctuating parameter;

determine a second value of the fluctuating parameter at a second point in time when making the second money transfer;

retrieve the first value of the fluctuating parameter from the host processor's memory using the customer provided lock-in value identifier; determine that the first value of the fluctuating parameter is more favorable to the customer for executing the second money transfer;

execute the second money transfer with the money-transfer system using the value of the first value the fluctuating parameter, wherein the risk of loss associated with using the more favorable value of the fluctuating parameter is assumed by the service provider; and notify the customer of the completion of the money transfer by electronic means.

17. The non-transitory machine-readable medium as recited in claim 16, wherein the unique lock-in value identifier received from the customer comprises one or more of the following: a cellular telephone number, a mobile telephone number, a land-line telephone number, a street address, an email address, a loyalty program number, a username/password combination, the customer's social security number, the customer's biometric information, the customer's fingerprint, and the customer's ID for the money transfer system.

* * * * *